United States Patent
Hassanzadeh et al.

(10) Patent No.: US 11,252,175 B2
(45) Date of Patent: Feb. 15, 2022

(54) CRITICALITY ANALYSIS OF ATTACK GRAPHS

(71) Applicant: Accenture Global Solutions Limited, Dublin (IE)

(72) Inventors: Amin Hassanzadeh, Arlington, VA (US); Kamrul Hasan, Norfolk, VA (US); Anup Nayak, Potomac, MD (US)

(73) Assignee: Accenture Global Solutions Limited, Dublin (IE)

( * ) Notice: Subject to any disclaimer, the term of this patent is extended or adjusted under 35 U.S.C. 154(b) by 240 days.

(21) Appl. No.: 16/658,415

(22) Filed: Oct. 21, 2019

(65) Prior Publication Data

US 2020/0137104 A1  Apr. 30, 2020

Related U.S. Application Data

(60) Provisional application No. 62/750,967, filed on Oct. 26, 2018.

(51) Int. Cl.
*H04L 29/06* (2006.01)

(52) U.S. Cl.
CPC ...... *H04L 63/1433* (2013.01); *H04L 63/1441* (2013.01)

(58) Field of Classification Search
CPC ............ H04L 63/1433; H04L 63/1441; G06Q 10/0635; G06F 21/56
See application file for complete search history.

(56) References Cited

U.S. PATENT DOCUMENTS

| | | | |
|---|---|---|---|
| 7,013,395 B1 * | 3/2006 | Swiler | H04L 63/1433 713/151 |
| 9,256,739 B1 * | 2/2016 | Roundy | H04L 41/0631 |
| 2007/0067845 A1 * | 3/2007 | Wiemer | H04L 63/1433 726/25 |
| 2016/0248796 A1 | 8/2016 | Choi et al. | |
| 2018/0124092 A1 * | 5/2018 | Pope | H04L 63/1433 |

(Continued)

FOREIGN PATENT DOCUMENTS

EP  2816773  12/2014

OTHER PUBLICATIONS

EP Search Report in European Application No. 19204907, dated Dec. 9, 2019, 6 pages.

*Primary Examiner* — Ali S Abyaneh
(74) *Attorney, Agent, or Firm* — Fish & Richardson P.C.

(57) ABSTRACT

Implementations of the present disclosure include providing, by a security platform, graph data defining a graph that is representative of an enterprise network, the graph comprising nodes and edges between nodes, a set of nodes representing respective assets within the enterprise network, each edge representing at least a portion of one or more lateral movement paths between assets in the enterprise network, determining, for each asset, a criticality of the respective asset to operation of a process, determining a lateral movement path between a first node represented by a first asset and a second node represented by second asset within the graph, determining a path value representative of a criticality in preventing an attack through the lateral movement path, and providing an indication of the path value representative of the criticality in preventing an attack through the lateral movement path.

16 Claims, 12 Drawing Sheets

(56) References Cited

U.S. PATENT DOCUMENTS

2019/0188389 A1* 6/2019 Peled ................... H04L 63/20
2020/0099702 A1* 3/2020 Rayes ................ H04L 43/0811
2020/0410109 A1* 12/2020 Yamada ................ G06F 21/57

* cited by examiner

CRITICALITY ANALYSIS OF ATTACK GRAPHS

CROSS-REFERENCE TO RELATED APPLICATION

This application claims the benefit of U.S. Provisional Application No. 62/750,967, filed Oct. 26, 2018, and titled "CRITICALITY ANALYSIS OF IIOT ATTACK GRAPHS," which is hereby incorporated by reference in its entirety.

BACKGROUND

Computer networks are susceptible to attack by malicious users (e.g., hackers). For example, hackers can infiltrate computer networks in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences.

Risk analysis is an important task for various kinds of systems such as Information Technology (IT) or Operational Technology (OT) systems. There has been work on risk analysis of IT networks, but researchers have not focused on risk analysis of cyber physical systems where IT and OT play a collaborative role. Most of the risk analysis works regarding IT focus on qualitative measure of damage with the help of attack graph formalism or converted Markov model or Bayesian formalism from attack graph, for example by using a ranking algorithm with an attack graph to rank assets in a network.

SUMMARY

The implementations described herein are directed to an agile security platform for enterprise-wide cyber-security. More particularly, implementations of the present disclosure are directed to an agile security platform that determines a criticality of assets. Some implementations may use a data driven modeling paradigm to assess risk in an Energy Delivery System (EDS) domain and define the quantitative node criticality. Some implementations use an attack graph in IT and OT combinedly to model attacker penetration throughout the critical assets. Some implementations also model node criticality based on network scanning data and host scanning data.

In some implementations, actions include providing, by a security platform, graph data defining a graph that is representative of an enterprise network, the graph comprising nodes and edges between nodes, a set of nodes representing respective assets within the enterprise network, each edge representing at least a portion of one or more lateral movement paths between assets in the enterprise network, determining, for each asset, a criticality of the respective asset to operation of a process, determining a lateral movement path between a first node represented by a first asset and a second node represented by second asset within the graph, determining a path value representative of a criticality in preventing an attack through the lateral movement path, and providing an indication of the path value representative of the criticality in preventing an attack through the lateral movement path.

These and other implementations can each optionally include one or more of the following features. In some aspects, determining, for each asset, a criticality of the respective asset to operation of the process includes determining a locality of the asset, determining a centrality of the asset, determining a damage of the asset, and determining the criticality based on the locality of the asset, the centrality of the asset, and the damage of the asset. In certain aspects, determining a locality of the asset includes determining a position of the node that corresponds to the asset in the enterprise network and determining the locality of the asset based on the position of the node that corresponds to the asset in the enterprise network.

In some implementations, determining a centrality of the asset includes determining a number of edges that are outgoing from the node that corresponds to the asset and determining the centrality of the asset based on the number of edges that are outgoing from the node that corresponds to the asset. In certain aspects, determining a centrality of the asset includes determining a number of unique edges that are outgoing from the node that corresponds to the asset and determining the centrality of the asset based on the number of unique edges that are outgoing from the node that corresponds to the asset. In some aspects, determining a centrality of the asset includes providing a prompt for a user to indicate a type of asset and determining the centrality of the asset based on the type of asset indicated by the user through the prompt.

In some implementations, determining a damage of the asset includes determining a load served by an intended substation, determining a total load serving by an energy delivery system, and determining the damage based on the load served by an intended substation and the total load serving by the energy delivery system. In certain aspects, determining a path value representative of a criticality in preventing an attack through the lateral movement path includes determining the path value based on the criticality of each of the assets represented by nodes along the lateral movement path. In some aspects, actions include remediating the attack through the lateral movement path. In some implementations, actions include determining a total risk for the enterprise network based on the graph and providing an indication of the total risk to a user.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference symbols in the various drawings indicate like elements.

DETAILED DESCRIPTION

Implementations of the present disclosure are directed to an agile security platform for enterprise-wide cyber-security. More particularly, implementations of the present disclosure are directed to an agile security platform that determines a criticality of assets including cyber-intelligence and discovery aspect of enterprise information technology (IT) systems, and enterprise operational technology (OT) systems, asset value, and potential for asset breach including hacking analytics of enterprise IT/OT systems performed in a non-intrusive manner.

Implementations of the present disclosure are described in detail herein with reference to an example context that includes cyber security and resilience in IT/OT systems. As described herein, implementations of the present disclosure enable users to determine which is the next critical device or problem to address in an attack path (lateral movement).

As described in further detail herein, the agile security platform of the present disclosure provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities of each CI are determined, and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

Figure 1:
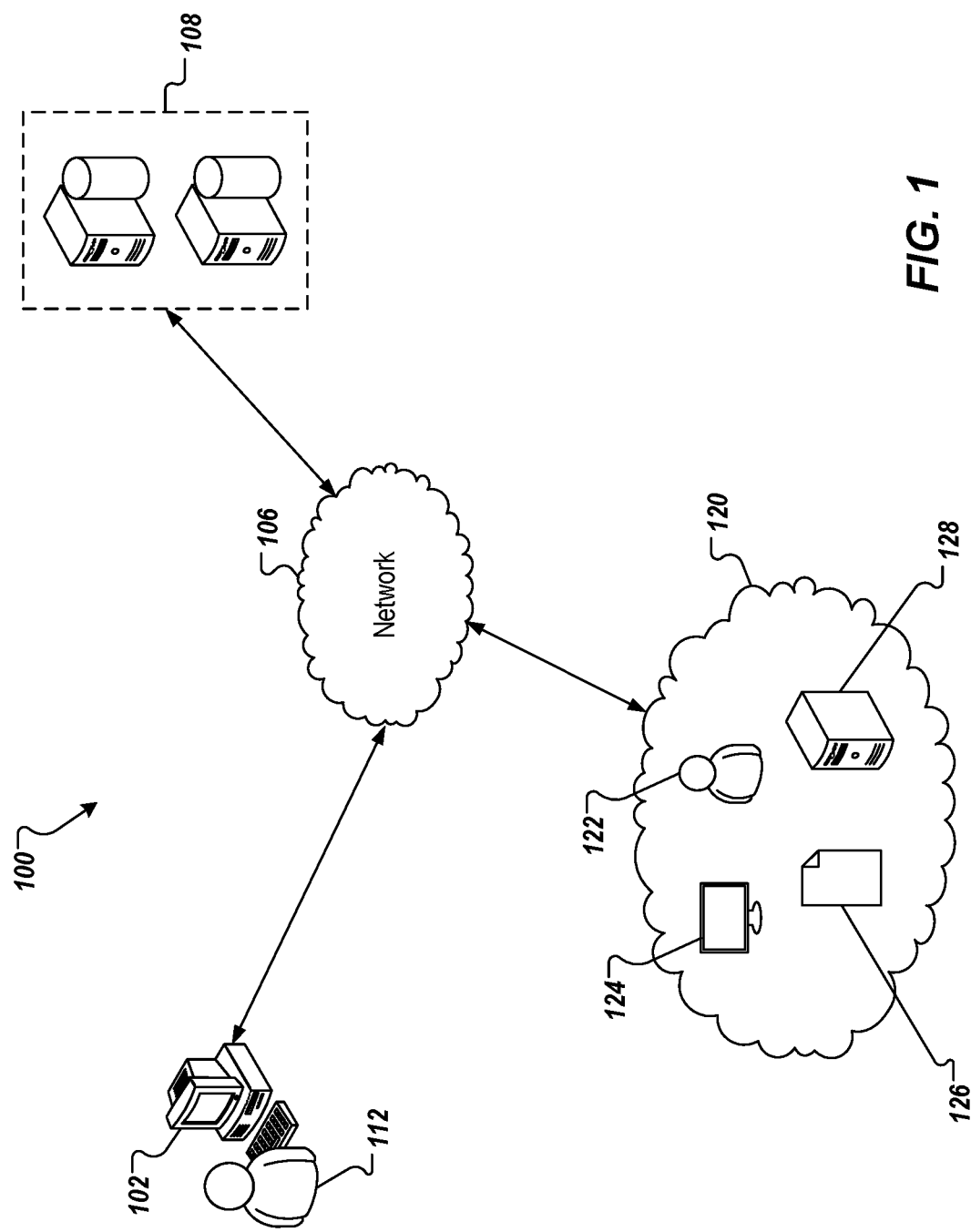
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120.

In some implementations, the agile security platform of the present disclosure is hosted within the server system 108, and monitors and acts on the enterprise network 120, as described herein. More particularly, and as described in further detail herein, the agile security platform detects IT/OT assets and generates an asset inventory and network maps, as well as processing network information to discover vulnerabilities in the enterprise network 120. Further, the agile security platform provides a holistic view of network and traffic patterns. In some examples, the enterprise network 120 includes multiple assets. Example assets include, without limitation, users 122, computing devices 124, electronic documents 126, and servers 128.

In some implementations, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In accordance with implementations of the present disclosure, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform of the present disclosure addresses lateral movements across the stack. Through devices, communication channels (e.g., email), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform of the present disclosure, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
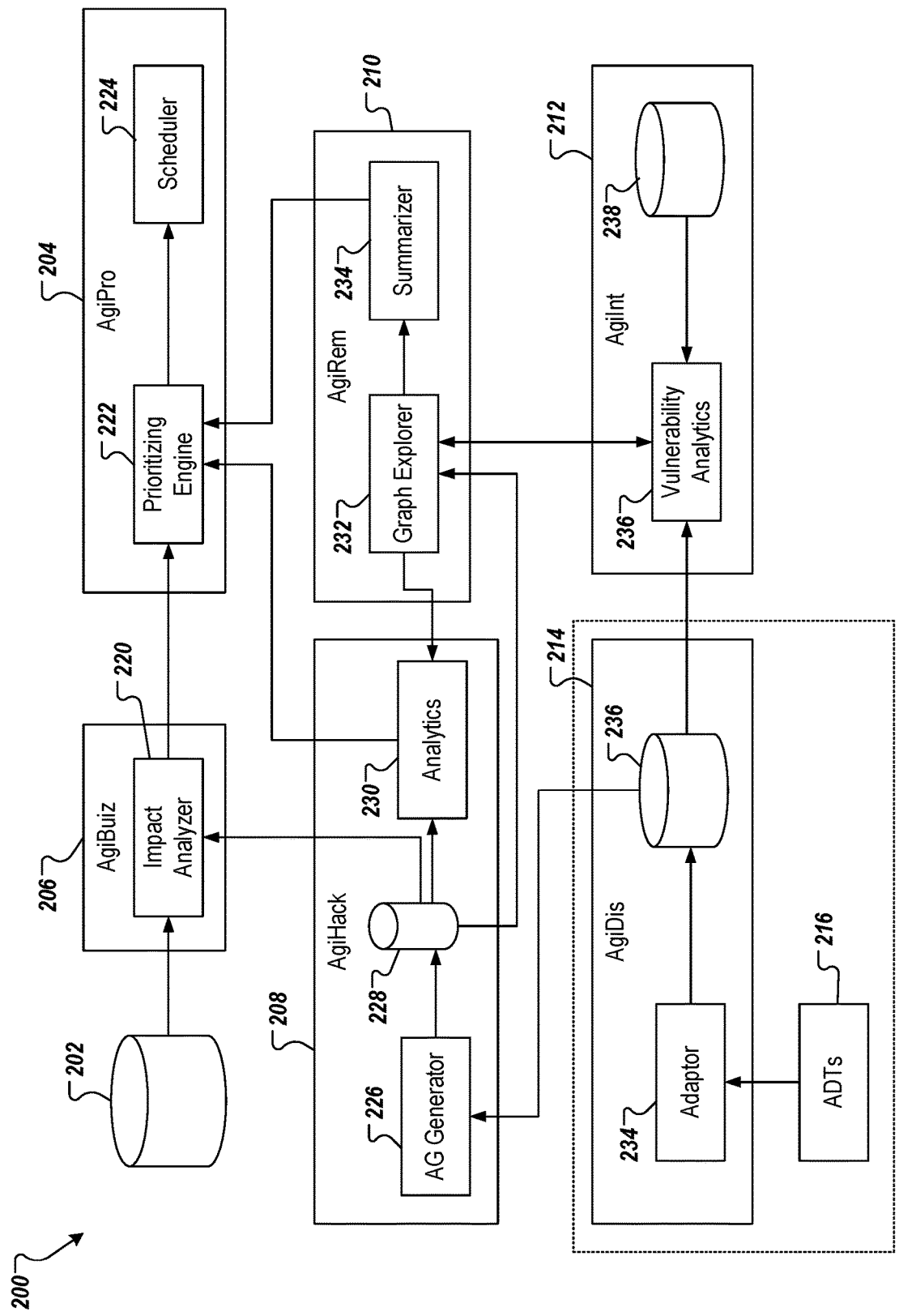
FIG. 2 depicts an example conceptual architecture of an agile security platform of the present disclosure.

FIG. 2 depicts an example conceptual architecture 200 of an agile security (AgiSec) platform in accordance with implementations of the present disclosure. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 236. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. The discovered assets can be used to generate an asset inventory, and network maps. In general, the AgiDis service 214 can be used to discover vulnerabilities in the enterprise network, and a holistic view of network and traffic patterns. In some implementations, this is achieved through passive network scanning and device fingerprinting through the adaptor 234 and ADT 216. The AgiDis service 214 provides information about device models. In some implementations, the automated asset discovery process uses active probing in the IT domain, and active and passive scanning in the OT domain.

Once all assets (also referred to herein as configuration items (CIs)) are discovered, threat intelligence knowledge-bases (e.g., iDefense, NVD, CVE) are used to extract cataloged vulnerabilities and security issues associated with discovered CIs, as described in further detail herein. In the example of FIG. 2, the AgiInt service 212 includes a vulnerability analytics module 236 and a threat intelligence knowledge base 238 (e.g., CVE, CAPEC, CWE, Maglan Plexus, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets.

In the example of FIG. 2, the AgiHack service 208 includes an attack graph (AG) generator 226, an AG database 228, and an analytics module 230. In general, the AgiHack service 208 constructs AGs and evaluates hacking exploitation complexity. In some examples, the AgiHack service 208 understand attack options, leveraging the vulnerabilities to determine how a hacker would move inside the network and identify targets for potential exploitation. The AgiHack service 208 proactively explores adversarial options and creates AGs representing possible attack paths from the adversary's perspective. The AgiHack service 208 provides both active and passive vulnerability scanning capabilities to comply with constraints, and identifies device and service vulnerabilities, configuration problems, and aggregate risks through automatic assessment.

In further detail, the AgiHack service 208 provides rule-based processing of data provided from the AgiDis service 214 to explore all attack paths an adversary can take from any asset to move laterally towards any target (e.g., running critical operations). In some examples, multiple AGs are provided, each AG corresponding to a respective target within the enterprise network. Further, the AgiHack service 208 identifies possible impacts on the targets. In some examples, the AG generator 226 uses data from the asset/vulnerabilities knowledge base 236 of the AgiDis service 214, and generates an AG. In some examples, the AG graphically depicts, for a respective target, all possible impacts that may be caused by a vulnerability or network/system configuration, as well as all attack paths from anywhere in the network to the respective target. In some examples, the analytics module 230 processes an AG to identify and extract information regarding critical nodes, paths for every source-destination pair (e.g., shortest, hardest, stealthiest), most critical paths, and critical vulnerabilities, among other features of the AG. If remediations are applied within the enterprise network, the AgiHack service 208 updates the AG.

In the example of FIG. 2, the AgiRem service 210 includes a graph explorer 232 and a summarizer 234. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths.

In further detail, for a given AG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 234 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

In some implementations, the AgiSec platform of the present disclosure provides tools that enable user interaction with multi-dimensional (e.g., 2D, 3D) visualizations of computational graph data and its derived computed attributes. In some examples, topological heat maps can be provided and represent ranks and values of the derived attributes in order to expedite search capabilities over big data. In some examples, the tools also enable searching for key attributes of critical nodes, nodes representing CIs. In some implementations, these visualizations are provided within a computer or immersive environment, such as augmented reality (AR), mixed reality (MR), or virtual reality (VR). The visualizations of the present disclosure improve the ability of an automated (employing contour lines) or human interactive (based on segmented regional selection) to employ search and filtering capabilities on big data graph topology aimed at quickly identifying critical nodes in the graph which its derived (computed) attributes serve as the search criteria. The attributes to be highlighted differ and are configurable, as such, different contour lines appear based on different criteria. In some examples, the perceived importance of an attribute relative to other attributes can be controlled in view of a scenario, vertical importance, or any domain-specific consideration, through weighed attributes. Further, similar contour lines can be identified in other nearby nodes on the graph. For an immersive visualization experience, matching leading contour lines can show hidden paths, or pattern of similar geometric shape and form, hence drive improved comprehension for humans.

In the context of cyber security, a critical node, also referred to herein as cardinal node, can represent a CI that is a key junction for lateral movements within a segmented network. Namely, once acquired as a target, the cardinal node can trigger multiple new attack vectors. Cardinal nodes can also be referred to as "cardinal faucet nodes." Another node will be one that many hackers' lateral movements can reach, yet it cannot lead to an additional node. Such nodes can be referred to as "cardinal sink nodes." In the network graph, the more edges from a cardinal faucet node to other nodes, the higher the faucet attribute is. The more incoming edges to a cardinal node, the higher the sink attribute is. If a node has both sink and faucet values in correlation, the more overall cardinal this node becomes to the entire examined graph topology and is defined as a critical target to be acquired since it provides control over multiple nodes in the graphs. In certain situations, the search for a faucet attribute is more important than a sink attribute. Such as a case of finding what node to block first to prevent a segregation of an attack outbreak. In case of finding what is very hard to protect, the more sink attributes matter more.

Figure 3:
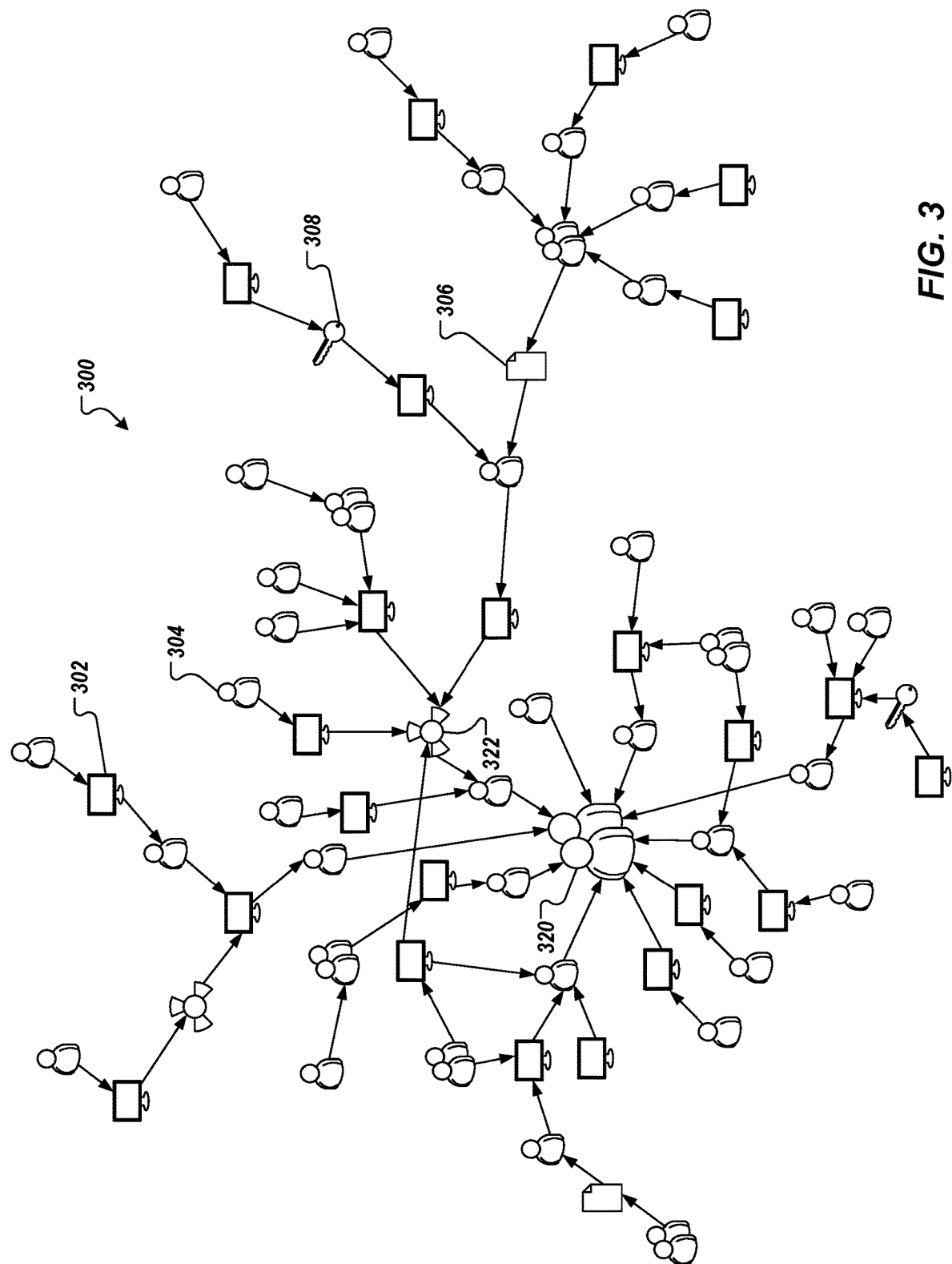
FIG. 3 depicts an example attack graph in accordance with implementations of the present disclosure.

FIG. 3 depicts an example portion 300 of an AG in accordance with implementations of the present disclosure. In some implementations, an AG is provided based on the network topology of the enterprise network. For example, the AgiHack service 208 of FIG. 2 can generate one or more AGs based on information provided from the AgiDis service 214. In some examples, an AG includes nodes and edges (also referred to as arches) between nodes. In some examples, a node can be associated with a semantic type. In the example domain of cyber-security and network topology, example semantic types can include, without limitation, computer 302, user 304, file 306, and key 308.

In some examples, an edge can include an incoming (sink) edge (e.g., an edge leading into a node from another node) or an outgoing (faucet) edge (e.g., an edge leading from a node to another node). In some examples, each edge can be associated with a respective activity. In the example domain of cyber-security and network topology, example activities can include, without limitation, logon (credentials), operating system access, and memory access. In some examples, each edge can be associated with a respective weight. In some examples, the weight of an edge can be determined based on one or more features of the edge. Example features can include a traffic bandwidth of the edge (e.g., how much network traffic can travel along the edge), a speed of the edge (e.g., how quickly traffic can travel from one node to another node along the edge), a difficulty to use the edge (e.g., network configuration required to use the edge), and a cost to use the edge (e.g., in terms of technical resources, or financial cost). In some examples, and as described in further detail below, the weights of the edges are determined relative to each other (e.g., are normalized to 1).

In some implementations, each node can be associated with a set of attributes. Example attributes can include, without limitation, the semantic type of the node, a number of incoming edges, a number of outgoing edges, a type of each of the edges, a weight of each of the edges, and the like. In some implementations, one or more values for a node can be determined based on the set of attributes of the node, as described in further detail herein.

The example portion 300 of the AG includes tens of nodes (approximately 70 nodes in the example of FIG. 3). It is contemplated, however, that an AG can include hundreds, or thousands of nodes. In some examples, the example portion 300 of the AG is a visualization of part of the AG based on one or more filter parameters. In some examples, a user can define filter parameters that can be used to identify cardinal nodes within an AG, and segments of the AG that may be relevant to a cardinal node. In the example of FIG. 3, a node 320 can be determined to be a cardinal node based on one or more filter parameters (e.g., no outgoing edges, and more than three incoming edges). In some examples, other depicted nodes include nodes along lateral paths that lead to a cardinal node.

In the example of FIG. 3, the node 320 can represent administrator credentials, a relatively high-value target within an enterprise network, and all other edges and nodes define the paths within the AG that lead to the node 320. While the AG can include hundreds, or thousands of nodes and edges, the example portion 300 is provided based on identification of the node 320 as the cardinal node (e.g., based on filter parameters) and all paths of the AG that lead to the node 320. In this manner, the portion 320 provides a more easily consumable visualization than depicting an entirety of the AG.

In some implementations, other nodes besides the cardinal node can be identified as relatively important nodes (e.g., relative to other depicted nodes). In some examples, the relative importance of a node can be determined based on attack paths that lead to a cardinal node. In the example of FIG. 3, a node 322 can be determined to be a relatively important node. Starting from the node 322, there is a single attack path to the node 320. However, there are approximately ten different attack paths that the node 322 is included in. Consequently, security resources could be concentrated on the node 322, as opposed to nodes upstream of the node 322 in the multiple attack paths. In this manner, security resources can more efficiently protect the node 320, as described in further detail herein.

Further, AGs can change over time. That is, there is a multi-dimensional aspect to AGs with one dimension including time. For example, and with continued reference to the example of FIG. 3, the node 320 can be considered a cardinal node based on the filter parameters. At another time, the node 320 might no longer be considered a cardinal node. For example, between the first time and the second time, values of attributes may have changed for nodes, some nodes may have been removed from the network (e.g., computers retired, users removed), and/or some nodes may have been added to the network (e.g., new computers/users).

As introduced above, implementations of the present disclosure provide for prioritization of actions for remediation of cyber attacks based on lateral movements of a malicious user within a network. More particularly, and as described in further detail herein, implementations of the present disclosure consider the ability of malicious users to access supporting CIs from the network through lateral movements and estimate which attack path should be handled first in order to prevent a comprised CI. In some implementations, a relative importance and complexity of an attack path are determined and cyber actions to block accessing a CI are prioritized. In this manner, cyber actions are efficiently implemented to prevent damage and reduce the attack surface and internals of the network, gradually increasing the entire network cyber resilience.

Figure 4:
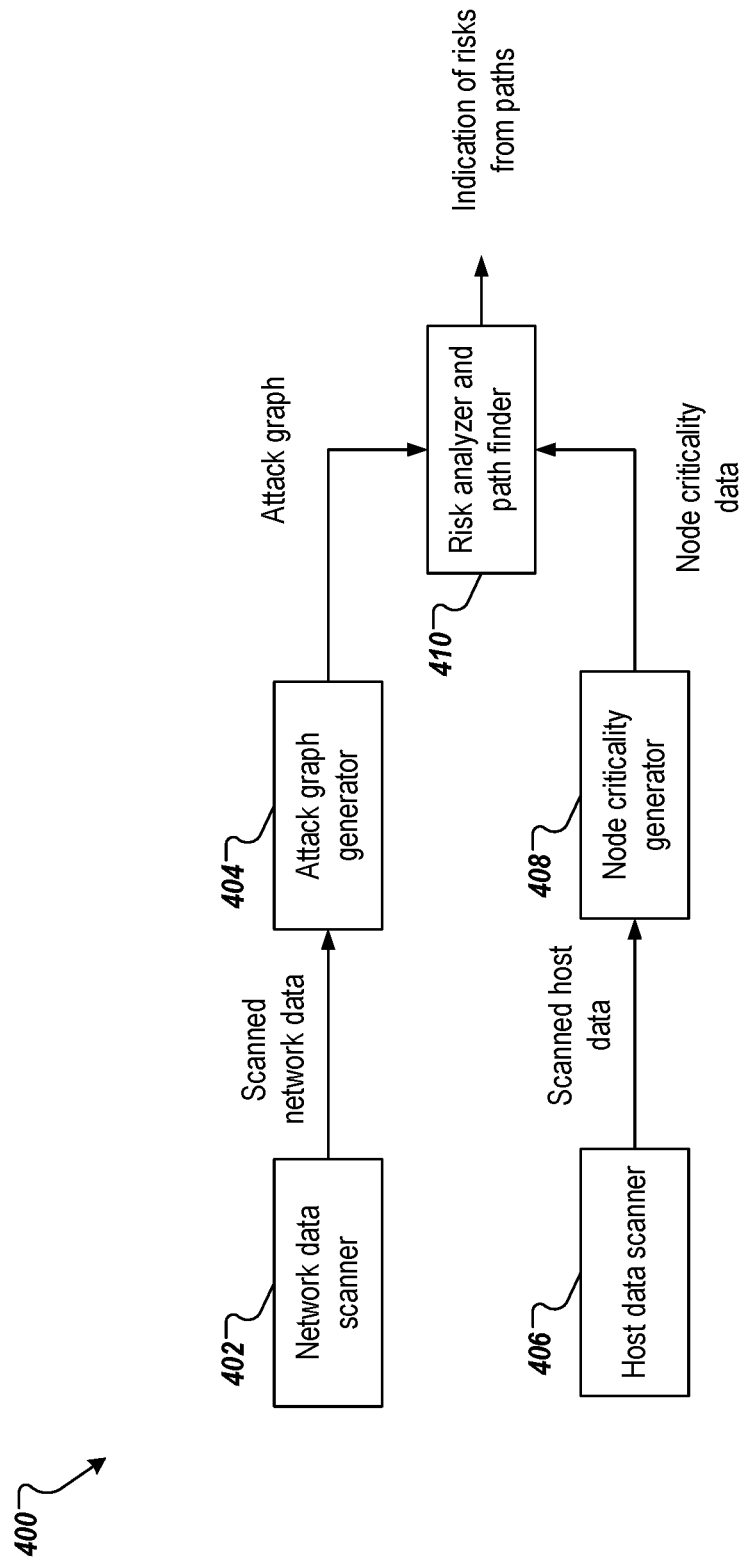
FIG. 4 depicts another example architecture that can that can be used to execute implementations of the present disclosure.

FIG. 4 depicts another example architecture 400 that can be used to execute implementations of the present disclosure. The architecture 400 includes a network data scanner 402, an attack graph generator 404, a host data scanner 406, a node criticality generator 408, and a risk analyzer and path finder 410.

The architecture 400 may collect network scanning data and host log data simultaneously through the network data scanner 402 and the host data scanner 406. The network data scanner 402 and host data scanner 406 may be, for example, the adaptor 234 and ADT 216 described in relation to FIG. 2.

The architecture 400 may create an attack graph from the network scanning data (e.g., by using MulVul) and calculate all parameters of node criticality from the host scanning data. For example, the attack graph generator 404 may be similar to the AG generator 226 described in relation to FIG. 2 and may generate an attack graph, and the node criticality generator 408 may generate node criticality data from the scanned host data.

The risk analyzer and path finder 410 may then calculate the risk of exploiting a state of attack graph by multiplying the probability of exploitation of the state and the damages that occur from that state. The damage may be quantified from node criticality factor for an Energy Delivery System (EDS). After receiving the attack graph with probability attack and damage factor at each state, a security administrator may filter out the most damageable path compare with most probable path and may optimize countermeasures.

Figure 5A:
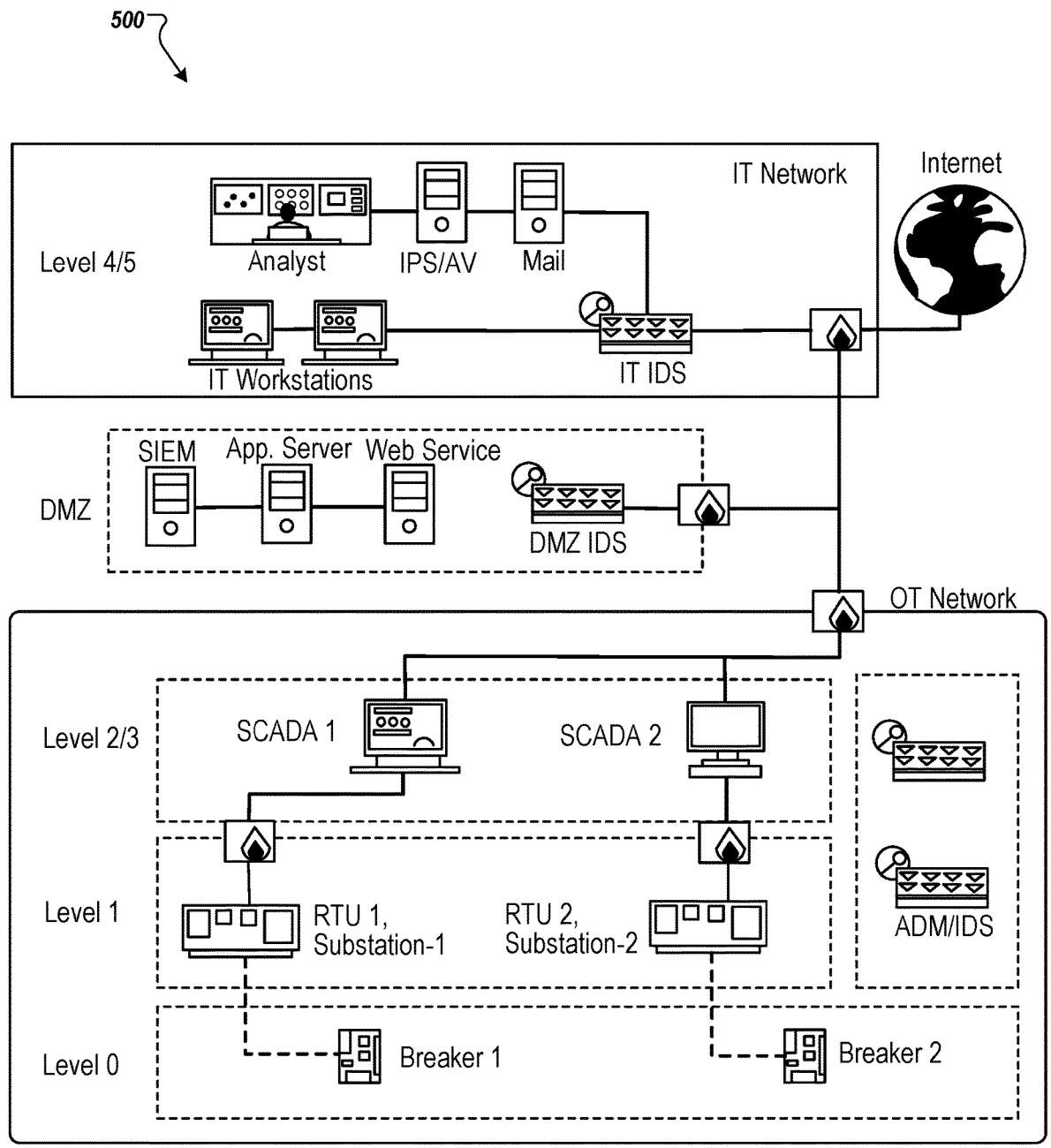
FIGS. 5A and 5B depict example diagrams of a resource graph and an attack graph that corresponds to the resource graph.
Figure 5B:
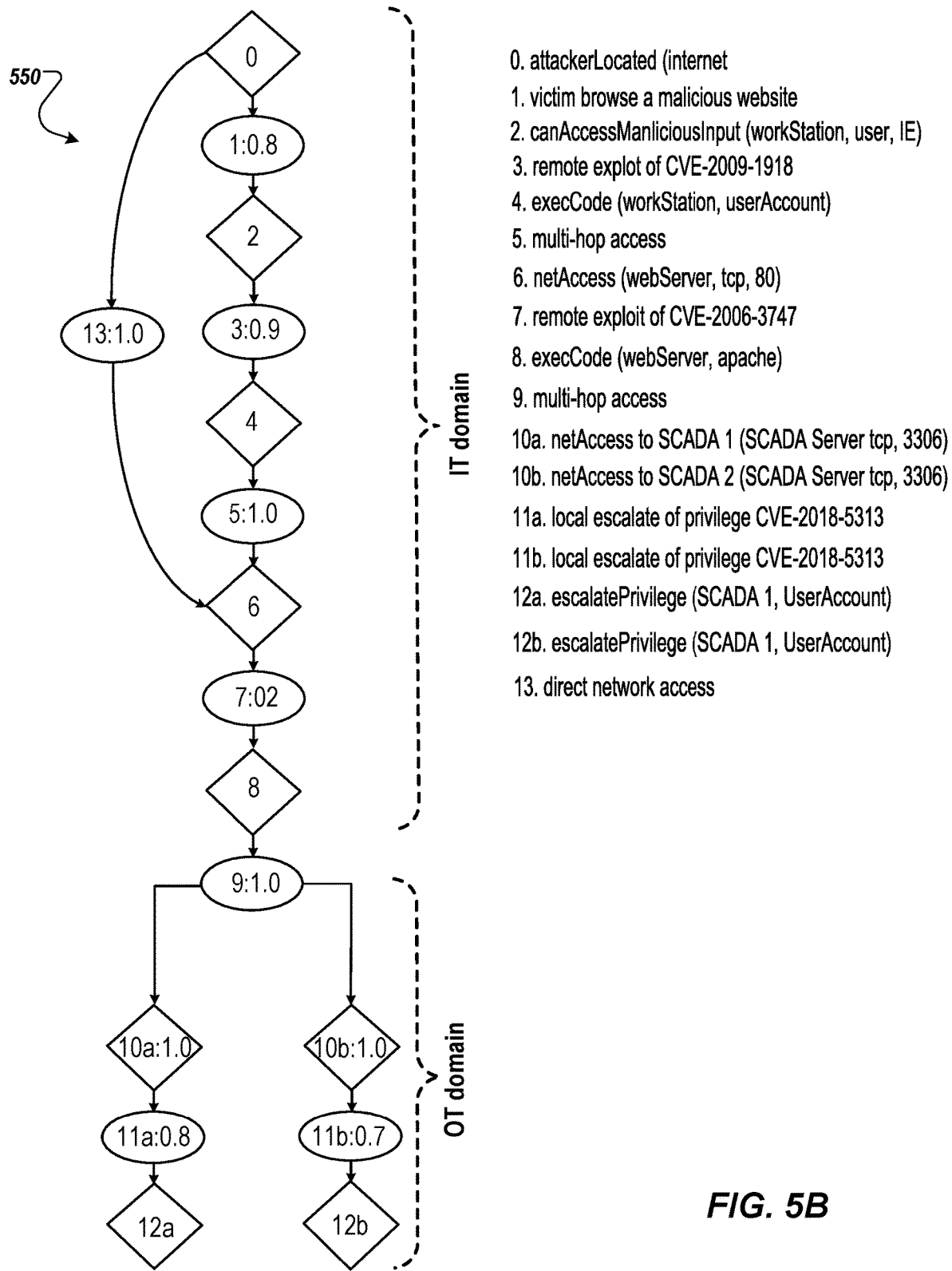

FIGS. 5A and 5B depict example diagrams of a resource graph 500 and an attack graph 550 that corresponds to the resource graph 500. The resource graph 500 shows an example diagram with six layers. For example, in the EDS network shown in FIGS. 5A and 5B, there are five subnets mediated by an external and different internal firewall. The IT workstations are in the IT subnet. The web server is in the DMZ subnet and is directly accessible from the Internet through the external firewall. The Supervisory Control And Data Acquisition (SCADA) servers (L3/L2), RTUs (L1) are in the different subnets under bigger OT subnet and hold critical communication. The SCADA servers and HMI servers are only accessible from the web server of the DMZ zone only. The web server is accessible from user workstations and other hosts from level 4/5. The user subnet contains the user workstations used by the company's employees. The firewalls allow all out-bound traffic from the User subnet.

The user workstations contain the vulnerability CVE-2009-1918 in the Internet Explorer. If a user accesses malicious content using the vulnerable IE browser, the machine may be compromised. The web server (DMZ) contains the vulnerability CVE-2006-37471 in the Apache HTTP service which can result in a remote attacker possibly executing arbitrary code on the machine. The SCADA server contains the vulnerability CVE-2018-5313 which could allow for escalating privilege up to administrator level and the HMI server contains the vulnerability CVE-2018-4844 which could allow users to read and write network information.

After analyzing the configuration of this network, MulVAL outputs an attack graph shown in FIG. 5B. The labels of the graph nodes are displayed at the right hand side of the network diagram. Two types of vertices are shown in this attack graph for simplicity. The diamond vertices represent privileges an attacker could obtain through exploiting the vulnerabilities in the system. The elliptic vertices represent an attack step that can lead to a privilege.

Node 0 is the attacker's initial privilege which in this case is a vantage point at the Internet. An attack can only be accomplished when all its pre-conditions are met; thus, the incoming arcs to an attack-step vertex form a logical AND relation. For example, node 7 (shown as "7:0.2" in the graph) represents the exploit of the web server vulnerability and the exploit can only happen when the attacker can access TCP port 80 on the web server (node 6). Multiple incoming arcs to a privilege vertex indicates more than one way to obtain the privilege and thus form a logical OR relation. For example, privilege 6 (net access to webserver) can be obtained either through compromising the workstations (4) or direct access from Internet (0).

The attack graph reveals many intrusion paths leading to the compromise of the various hosts. An attacker could first compromise web server and use it as a stepping stone to further attack the SCADA 1/SCADA 2 server (0, 13, 6, 7, 8, 9, 10a, 11a, 12a; 0, 13, 6, 7, 8, 9, 10b, 11b, 12b), or he could first gain control on a user workstation by tricking a user to click a malicious link and launch further attacks from the workstation towards SCADA 1/SCADA 2 servers (0, 1, 2, 3, 4, 5, 6, 7, 8, 9, 10a, 11a, 12a; 0, 1, 2, 3, 4, 5, 6, 7, 8, 9, 10b, 11b, 12b;).

There can be many other attack paths. In general, enumerating all possible attack paths in a system the number will be exponential. However, the privileges and attacks on all these paths are inter-dependent on each other and the number of pair-wise inter-dependencies is quadratic to the size of the network. Instead of enumerating all attack paths, a logical attack graph like MulVAL enumerates the inter-dependencies among the attacks and privileges. This provides an efficient polynomial-time algorithm for computing a compact representation of all attack paths in a system.

Although the example attack graph is computed from known vulnerabilities, attack graphs are equally powerful in reasoning about unknown (zero-day) vulnerabilities, by introducing hypothetical vulnerabilities in the input. Such hypothetical vulnerabilities can be marked in the produced attack graphs and handled accordingly in the subsequent analysis. Attack graphs are often perceived to offer a deterministic view of EDS network security: an attack can succeed if all its preconditions are met, and a privilege can be obtained if the graph shows a path leading to it from the attacker's initial privilege. This type of deterministic semantics is certainly valuable and one can use it to conduct various types of useful analysis. However, the reality of practical EDS security management is far from a clear-cut zero/one view.

Take the vulnerability CVE-2018-5313 on the SCADA server as an example. The official description found on the CVE website (http://cve.mitre.org/cgi-bin/cvename.cgi?name=CVE-2018-5313) says: "A vulnerability allows local attackers to escalate privilege on Rapid Scada 5.5.0 because of weak C:\SCADA permissions. The specific flaw exists within the access control that is set and modified during the installation of the product. The product sets weak access control restrictions. An attacker may leverage this vulnerability to execute arbitrary code under the context of Administrator, the IUSR account, or SYSTEM."

The word "may" highlights that the true consequence of exploiting the vulnerability is far from certain. Since this vulnerability may be one of the first stepping stones for the subsequent attacks, the likelihood for an attacker to obtain the other privileges are also affected by the likelihood he can succeed at this first stage. A system administrator would typically conduct some research on the web to "get a sense" on how likely an attacker, given access to the vulnerability, would be able to successfully exploit it. He then combines this with the specific situation in his own network to gauge the risk.

This is an important process since most organizations operate under limited resources and cannot afford to fix all potential security problems. Without an understanding of the likelihood a vulnerability can lead to real damage, it will be hard to see how the potential damage compares to the costs incurred by the various countermeasures (e.g. down time due to patching) and make sensible decisions. Implementations described herein transform this field into a science by designing objective quantitative security metrics built upon attack-graph techniques.

The criticality of a node in an EDS depends on many factors. Three factors below are focused on to model the criticality of a node in a data driven EDS.

$$C(i) = \alpha l(i) + c + \gamma d(i) \quad \text{Equation (1)}$$

Where C(i) is the criticality of the node i. α, β & γ are three tuning factors that can be set from system administrators or planners. l(i), c(i) & d(i) indicate locality, centrality and damage factors of criticality respectively of the node i.

Locality (l): The locality of criticality of a node is defined as the criticality from the position of a node in a network architecture. The criticality of a node primarily depends on this position. Like in an EDS the SCADA and HMI servers are located at level 2, which is more critical than workstations located at level 4/5. Normally the identification of a node type is mapped from the running services and processes which can be collected by querying different systems simultaneously. This criticality factor may come from system administrator as an input.

Centrality (c): After a node is localized in a standard EDS structure, the criticality among same level nodes is differentiated. There can be multiple SCADA servers and HMI servers at level 2, although the criticality for locality is the same for all nodes at that level, due to variance in attack propagation opportunity from individual node, the overall criticality per node can be different. The centrality of nodes can differentiate criticality of nodes at the same level.

Three different measures of node centrality are degree, closeness, and betweenness. One approach focuses only on degree of centrality as a factor of node criticality. A weighted network can be used to calculate the degree of centrality. The weights are calculated from the number of packets (TCP, DNP3, etc.) that are exchanging a pair of nodes. Those exchanging packets are collected from real time network wise passive packet trapping by TCP dump or protocol analyzer. The weight is then extracted by normalizing the exchanged packets of pairs by total packets during a defined time.

Degree: Degree of a focal node is the number of adjacencies in a network, i.e. the number of nodes that the focal node is connected to. This measure can be formalized as:

$$k_i = c_d(i) = \sum_j^N x_{ij} \quad \text{Equation (2)}$$

where i is the focal node, j represents all other nodes, N is the total number of nodes, and x is the adjacency matrix, in which the cell $x_{ij}$ is defined as 1 if node i is connected to node j, and 0 otherwise.

Degree has generally been extended to the sum of weights when analyzing weighted networks and labeled strength on node. This measure has been formalized as follows:

$$s_i = c_d^w(i) = \sum_j^N w_{ij} \quad \text{Equation (3)}$$

Where, $w_{ij}$ is defined as the weight of the link from node i to j. Sometimes the weights of two nodes can be same in a network. In that case, to tie the break degree which indicates the number of links a node is connected to may be considered. Degree and strength may also be both indicators of the level of involvement of a node in the surrounding network, and both of these measures may be incorporated when studying the centrality of a node.

To combine both degree and strength, a tuning parameter, may be used which determines the relative importance of the number of links compared to tie weights. More specifically, a degree centrality measure, which is the product of the number of nodes that a focal node is connected to, may be used and the average weight to these nodes adjusted by the tuning parameter. The measure may be determined as below:

$$c_d^{w\delta}(i) = k_i \times \left(\frac{s_i}{k_i}\right)^\delta = k_i^{(1-\delta)} \times s_i^\delta \quad \text{Equation (4)}$$

Where δ is a positive tuning parameter and can be set to the system and network context. If this parameter is between 0 and 1, then having a high degree is taken as favorable, whereas if it is set above 1, a low degree is favorable.

Damage Factor: A disadvantage of degree centrality may be that it only captures the relation between adjacent node and fails to address global topological properties. In that case, to address this challenge in EDS context, another criticality factor may be defined named damage at physical process level (L2&L1). This information may be found from the exchanged DNP3 messages among SCADA server and substations' Remote Terminal Unit (RTUs). RTUs periodically transmit voltage, current level towards SCADA server so that SCADA can control a substation's operation. From this voltage and current level, SCADA server calculate the operational load of a substation. So, if an attack happened at process level then maximum that much of damage can create. The damage criticality factor is defined as:

$$d_i^p(i) = \frac{L(i)}{\sum_k^s L(k)} \quad \text{Equation (5)}$$

Where L(i) indicates the load is serving by an intended substation and $\Sigma_k^s L(k)$ refers to the total load serving by an EDS. s indicates the total number of substations in an EDS.

Risk Analysis of the Network: The attack graph of an EDS network gives the logical representation of attacker penetration to the network representation from logical states extracts from network scanning (i.e. Nessus). The damage factor may be tied up with every state to analyze the risk of those states that are need. How much damage occurs from an attack may depend on the criticality of that state multiplied by the probability of the attack occurring. So, the risk of a state in attack graph is defined as:

$$R(i) = p(i) \times C(i) \quad \text{Equation (6)}$$

Where R(i) defines the risk at state, p(i) indicates probability of occurring an attack at a state and C(i) is the criticality of that state that will give the measure of damage. The criticality of a state may refer to the criticality of a node.

One example may be from an adjacency matrix of six nodes. The topological network and attack graph may be as shown in FIGS. 5A and 5B. An allocation of packets is given in the Table I. The total exchanged packets during this time is 8006.

TABLE I

Adjacent matrix with total byte exchanges between a pair.

Total packets = 8006

|  | Ws | WeS | SCADA 1 | SCADA 2 | RTU 1 | RTU 2 |
|---|---|---|---|---|---|---|
| Ws (Workstation) | 0 | 205 | 0 | 0 | 0 | 0 |
| WeS (Webserver) | 205 | 0 | 510 | 480 | 0 | 0 |
| SCADA 1 | 0 | 510 | 0 | 100 | 1108 | 0 |
| SCADA 2 | 0 | 480 | 100 | 0 | 0 | 1200 |
| RTU 1 | 0 | 0 | 1108 | 0 | 0 | 400 |
| RTU 2 | 0 | 0 | 0 | 1200 | 400 | 0 |

The weight between pairs may be calculated from this from this packet allocation by dividing the exchanged packets by the total numbers of packet transferred. Table II is showing the weighted adjacency matrix.

TABLE II

Adjacent matrix with weighted value between a pair.

|  | Ws | WeS | SCADA 1 | SCADA 2 | RTU 1 | RTU 2 |
|---|---|---|---|---|---|---|
| Ws | 0 | 0.026 | 0 | 0 | 0 | 0 |
| WeS | 0.026 | 0 | 0.064 | 0.06 | 0 | 0 |
| SCADA 1 | 0 | 0.064 | 0 | 0.013 | 0.14 | 0 |
| SCADA 2 | 0 | 0.06 | 0.013 | 0 | 0 | 0.15 |
| RTU 1 | 0 | 0 | 0.14 | 0 | 0 | 0.05 |
| RTU 2 | 0 | 0 | 0 | 0.15 | 0.05 | 0 |

Figure 6:
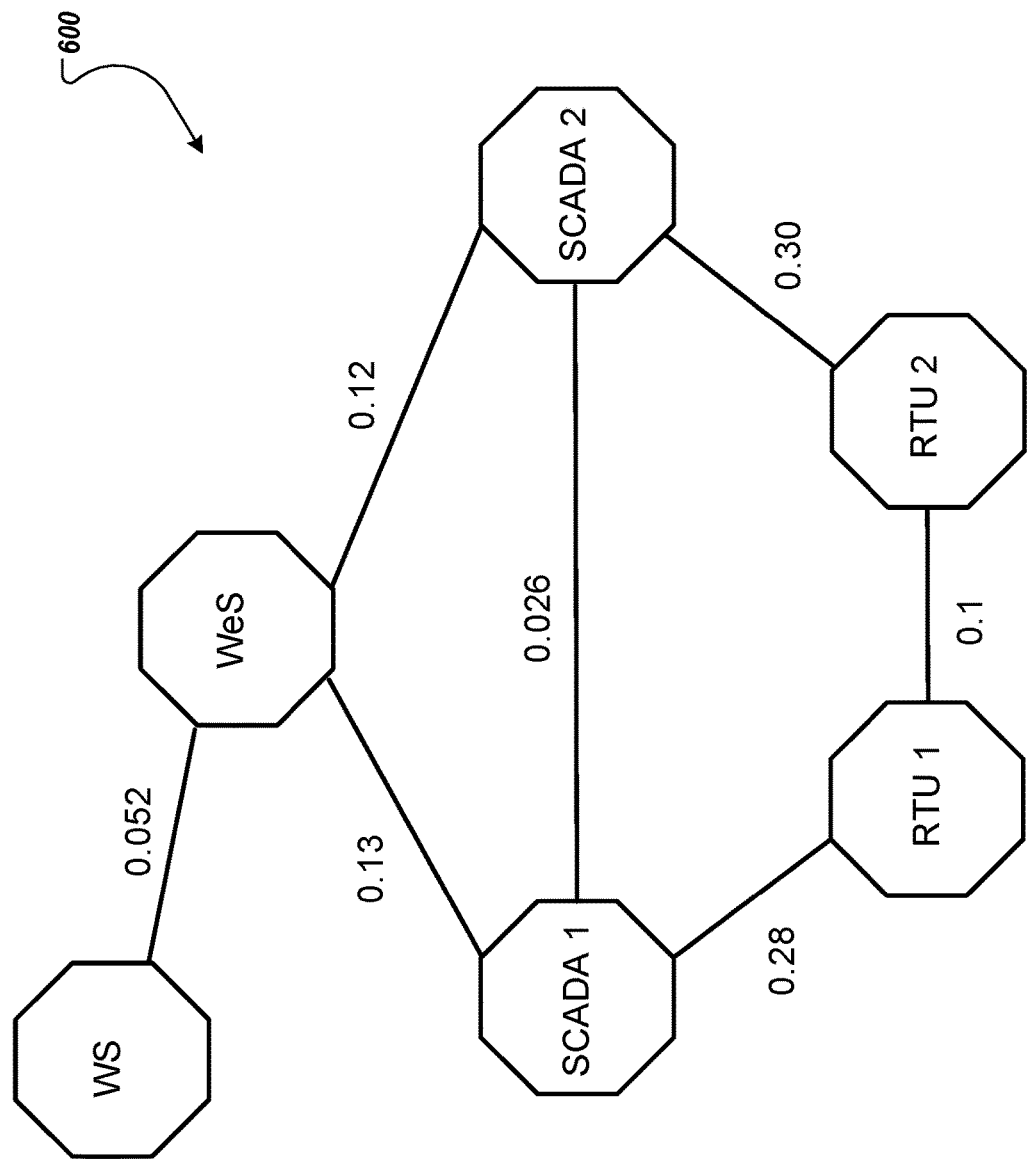
FIG. 6 depicts an example weighted graph of nodes.

FIG. 6 depicts an example weighted graph 600 of nodes. The weighted graph 600 may be generated from the weighted matrix. From this graph, the centrality of criticality metric may be calculated as depicted in Table III for different value of tuning value.

TABLE III

Degree centrality score when different values of δ are used.

| | | | $C_D^W = k_i^{(1-\delta)} \times s_i^\delta$ when δ= | | | |
|---|---|---|---|---|---|---|
| Node | $C_D$ | $C_D^W$ | 0 | 0.5 | 1.0 | 1.5 |
| WS | 1 | 0.052 | 1 | 0.228 | 0.052 | 0.0118 |
| WeS | 3 | 0.302 | 3 | 0.952 | 0.302 | 0.1744 |
| SCADA 1 | 3 | 0.436 | 3 | 1.144 | 0.436 | 0.1662 |
| SCADA 2 | 3 | 0.446 | 3 | 1.157 | 0.446 | 0.1719 |
| RTU 1 | 2 | 0.38 | 2 | 0.872 | 0.38 | 0.1656 |
| RTU 2 | 2 | 0.4 | 2 | 0.894 | 0.4 | 0.1789 |

Table III illustrates the effect of the δ on the value of degree of centrality for the nodes of the network in FIG. 3. As shown by this table, when δ=1 the measure's value equal the node's strength (eq. 3). When δ<1 and the total node strength is fixed, the number of contacts over which the strength is distributed increases the value of the measure. For example, when δ=0:5, node WeS attains a higher score than node RTU 1/RTU 2, despite having the almost same node strength. Conversely, when δ>1 and the total node strength is fixed, the number of contacts of which the strength is distributed decrease the value of the measure in favor of a greater concentration of node strength on only a few nodes. Hence, node WeS attains almost same value of the measure than node SCADA 1/SCADA 2. So, logically in the EDS model a tuning parameter may be 0<δ≤1.

The overall criticality (C): To compute the total criticality of a node in EDS context, the locality of criticality (l) and damage of criticality (d) are computed. The locality of a node in EDS is determined from the application log, service log (HMI tick, SCADA critical and Non-critical services) and process log from a host. Those logs collected at the same time when logs for centrality are collected. Normally according to Purdue model, the higher the level of a node, the lower the locality of criticality of that node. To calculate the damage factor, the messages that regulate the level 0 sensors and breakers may be focused on. Usually, all those communication may go through DNP3 protocols. The DNP3 messages may be used to determine that the SCADA 1 is controlling a substation of 3 MW load whereas the SCADA 2 is controlling a substation of 2 MW substation. After getting those values, the damage factor of criticality may be determined by plugging in Eqn. 5.

TABLE IV

The calculation of total criticality

| Node Type | Locality (l) | Centrality ($c_d^w$ δ = 0.5) | Damage (d) | Total Criticality (C) (α = 0.25, β = 0.25, γ = 0.5) |
|---|---|---|---|---|
| Ws | 1 | 0.228 | 0 | 0.3057 |
| WeS | 2 | 0.952 | 0 | 0.738 |
| SCADA 1 | 3 | 1.144 | 0.6 | 1.336 |
| SCADA 2 | 3 | 1.157 | 0.4 | 1.239 |
| RTU 1 | 4 | 0.872 | 0.1 | 1.268 |
| RTU 2 | 4 | 0.894 | 0.01 | 1.228 |

Now total criticality of a node may be calculated after plugging in criticality of locality (l), criticality of centrality ($c_d^w$) from Table III and criticality of damage (d) in Eqn. 1. In Table IV the last column shows the total criticality of a node in EDS.

Critical Path for Attacker: To calculate the critical path from administrator perspective, the conditional probability (CP) of every state in AG may be calculated and multiplied with the criticality of that state. Here the critical path indicates the path which creates the most damage to the organization. The most probable attack path may not necessarily be the same as the most critical path. For an extremely skilled and knowledgeable attacker, critical path may matter more than probable path. There have two types of nodes in AG; one is AND and another is OR node. The CP equations for AND and OR node is:

If the execution of a node e requires two conditions $c_1$ and $c_2$ then, $$p(e)=p(c_1) \cdot p(c_2) \cdot p(e) \qquad \text{Equation (7)}$$

If a condition c can be satisfied by either $e_1$ or $e_2$ (or both) then:

$$p(c)=p(c)(p(e_1)+p(e_2)-p(e_1) \cdot p(e_2)) \qquad \text{Equation (8)}$$

Figure 7:
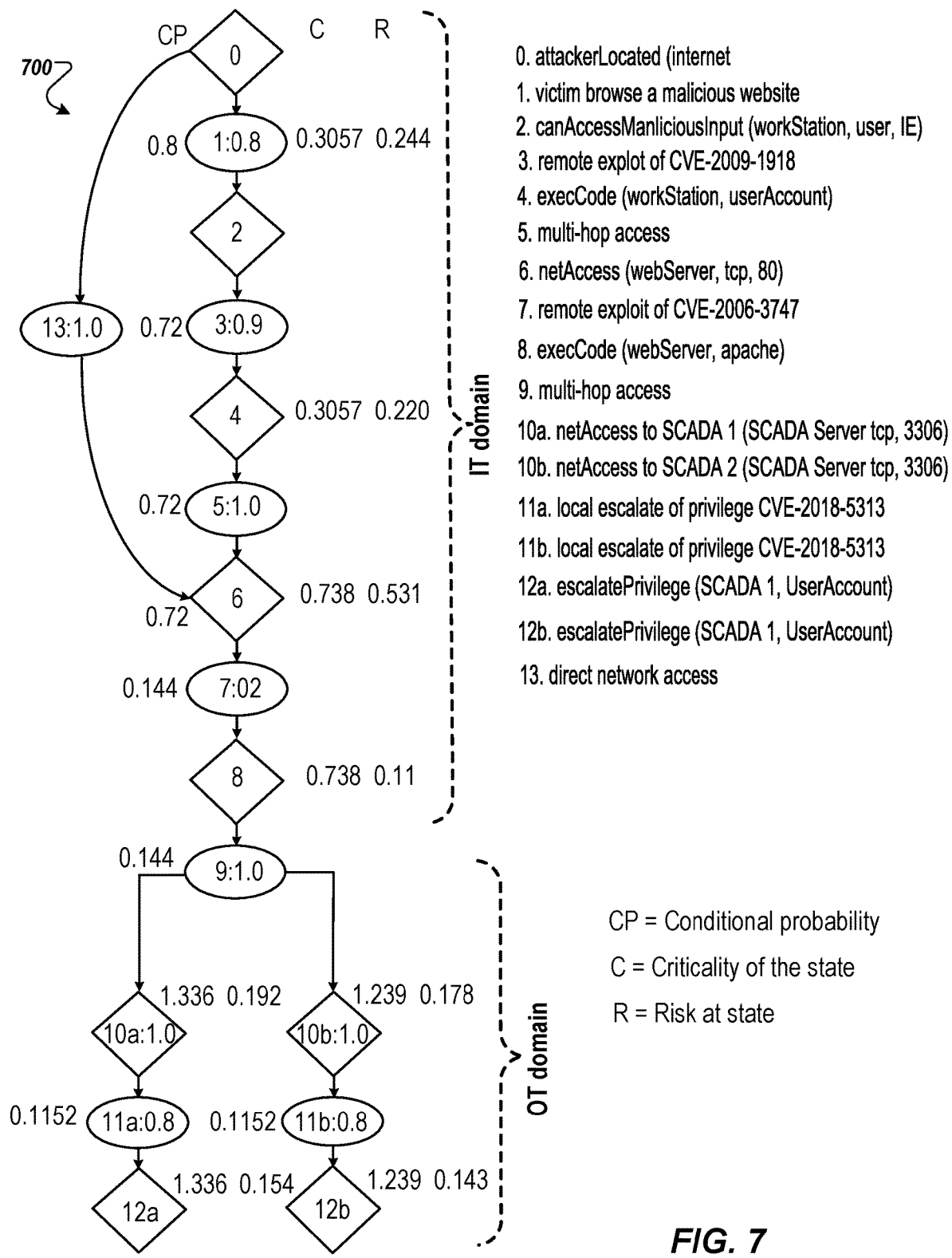
FIG. 7 depicts an example diagram of an attack graph with labels from risk analysis.

FIG. 7 depicts an example diagram of an attack graph 700 with labels from risk analysis. The attack graph 700 shows EDS AG with conditional probability and risk analysis. After careful logical interpretation, many logical paths for attacker penetration may be determined as given in the Table V.

TABLE V

Most probable and most critical paths

| Path type | Final Goal | Path propagation | Probability/Risk |
|---|---|---|---|
| Most Probable | SCADA 1 | 0 → 1 → 2 → 3 → 4 → 5 → 6 → 7 → 8 → 9 → 10a → 11a → 12a | P = 0.1152 |
| | | 0 → 13 → 6 → 7 → 8 → 9 → 10a → 11a → 12a | P = 0.1152 |
| | SCADA 2 | 0 → 1 → 2 → 3 → 4 → 5 → 6 → 7 → 8 → 9 → 10b → 11b → 12b | P = 0.1152 |
| | | 0 → 13 → 6 → 7 → 8 → 9 → 10b → 11b → 12b | P = 0.1152 |
| Most critical | SCADA 1 | 0 → 1 → 2 → 3 → 4 → 5 → 6 → 7 → 8 → 9 → 10a → 11a → 12a | C = 1.451 |
| | | 0 → 13 → 6 → 7 → 8 → 9 → 10a → 11a → 12a | C = 0.987 |
| | SCADA 2 | 0 → 1 → 2 → 3 → 4 → 5 → 6 → 7 → 8 → 9 → 10b → 11b → 12b | C = 1.426 |
| | | 0 → 13 → 6 → 7 → 8 → 9 → 10b → 11b → 12b | C = 0.962 |

It is shown in the Table V that, although there are paths with the same probability to exploit from attacker origination to goals SCADA 1/SCADA 2, damages that occur along the paths are not same. Accordingly, a logical knowledgeable attacker may always select the path where he/she can create the most damage. So, the attacker choice should go to the path 0→1→2→3→4→5→6→7→8→9→10a→11a→12a where maximum damage along the path is 1.451.

Accordingly, the most probable path is not the path that an attacker always propagates through. If an administrator can model the node criticality with great confidence and incorporate with the attack paths then the most critical path is likely to be the most probable path for a smart attacker.

Figure 8:
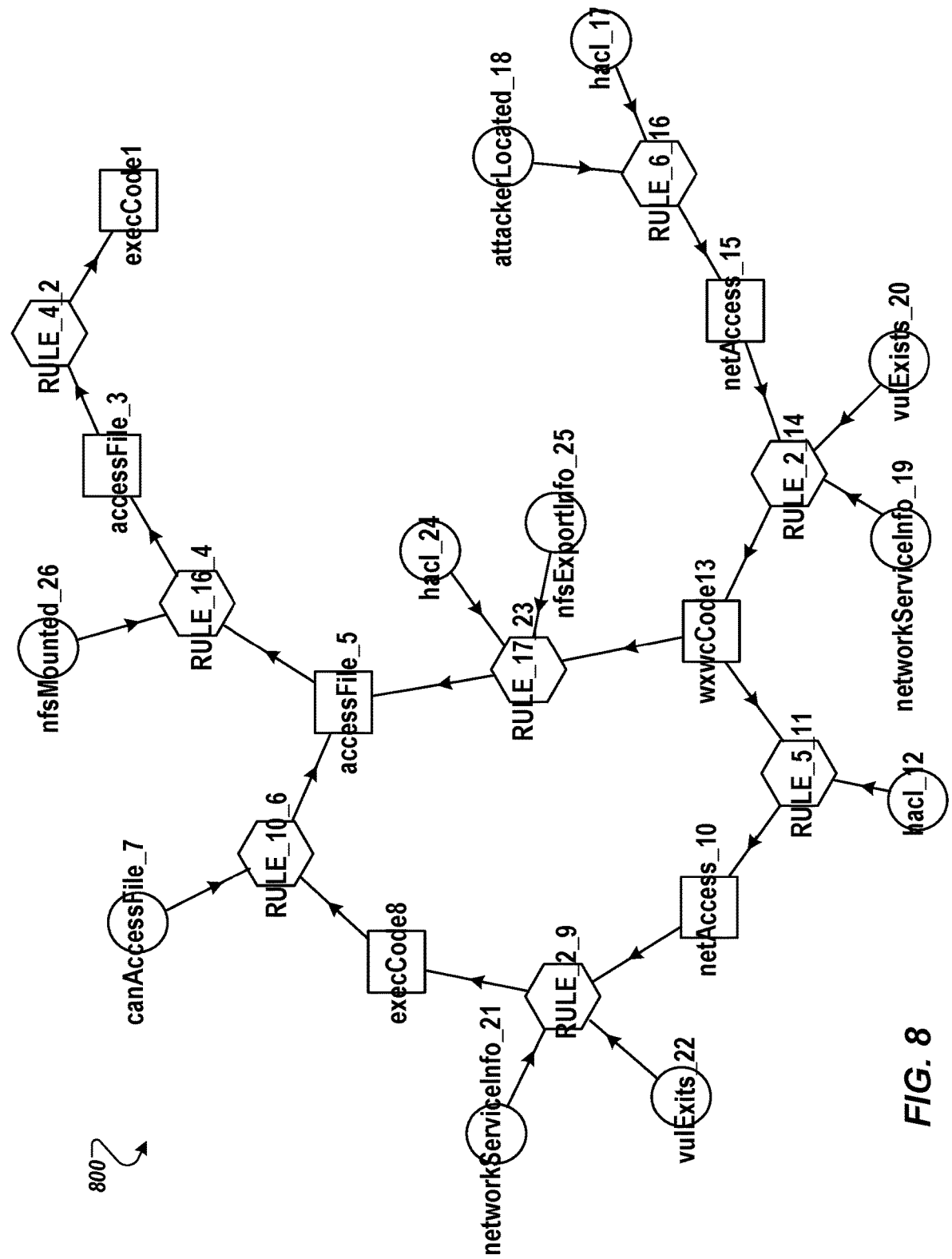
FIG. 8 depicts an example diagram of an analytical attack graph.

FIG. 8 depicts an example diagram of an analytical attack graph (AAG) 800. An AG may be a directed graph modeled as G(V, E) with a set of nodes V={v1, v2, ... vn} and a set of edges E={e1, e2, ... em} connecting nodes together, where |V|=n and |E|=m. Nodes in an AG may be of three different types.

The circular nodes in the AAG 800 may denote system or network configurations. These may be the conditions that provide possibilities for actions by the adversary. For example, nodes labeled such as "hacl," "nfsMounted" and "vulExists" in AAG 800. Configurations may be proper (e.g., service is running, port is open) or improper (e.g., vulnerability exist).

The hexagonal nodes in the AAG 800 may represent the reasoning rules which usually represent the attack methodology leveraged by an adversary to achieve a particular goal. The square nodes in the AAG 800 may represent impact nodes that indicate the sub-goal for a certain action that the attacker could take. For example, the nodes labeled as "NetAccess," "accessFile" and "execCode" are examples of impacts ranging from benign to catastrophic. Both impact nodes and configuration nodes may be considered as conditions in the network. Impact nodes may be issues while only some of the configuration nodes (i.e., only improper configurations) may be counted as issues.

An attack graph may be created by taking into account the configurations directed by some rules in order to make some impacts on the target network. For example, all configuration, impact and rule nodes may be enclosed in sets C, I, R, respectively. Therefore, C={cj|cj∈V, ∀cj is a configuration} that is {c1=v17, c2=v18, c3=v19, c4=v20, ... } in the AAG 800, I={ij|ij∈V, ∀ij is an impact} which is equivalent to {i1=v13, i2=v15, ... } in the AAG 800, and lastly, R={rj|rj∈V, ∀rj is a rule} is {r1=v14, r2=v16, ... } in the example shown in the AAG 800. Thus, the combination of these sets comprises all vertices of the graph G i.e. V={C, I, R}.

A Physical Attack Graph (PAG) may help attack graphs scale for large networks in terms of visualization while no detail is lost. In order to convert an AAG to PAG, every set of configuration node, reasoning rule, and the impact (e.g., C17, C18, R16, and i15 in FIG. 3) may be considered as one attack technique or attack state/step. Each attack technique may be then shown as an action taken by the attacker that sometimes help the attacker to laterally move to another physical node or escalate the privilege in the same node.

Figure 9:
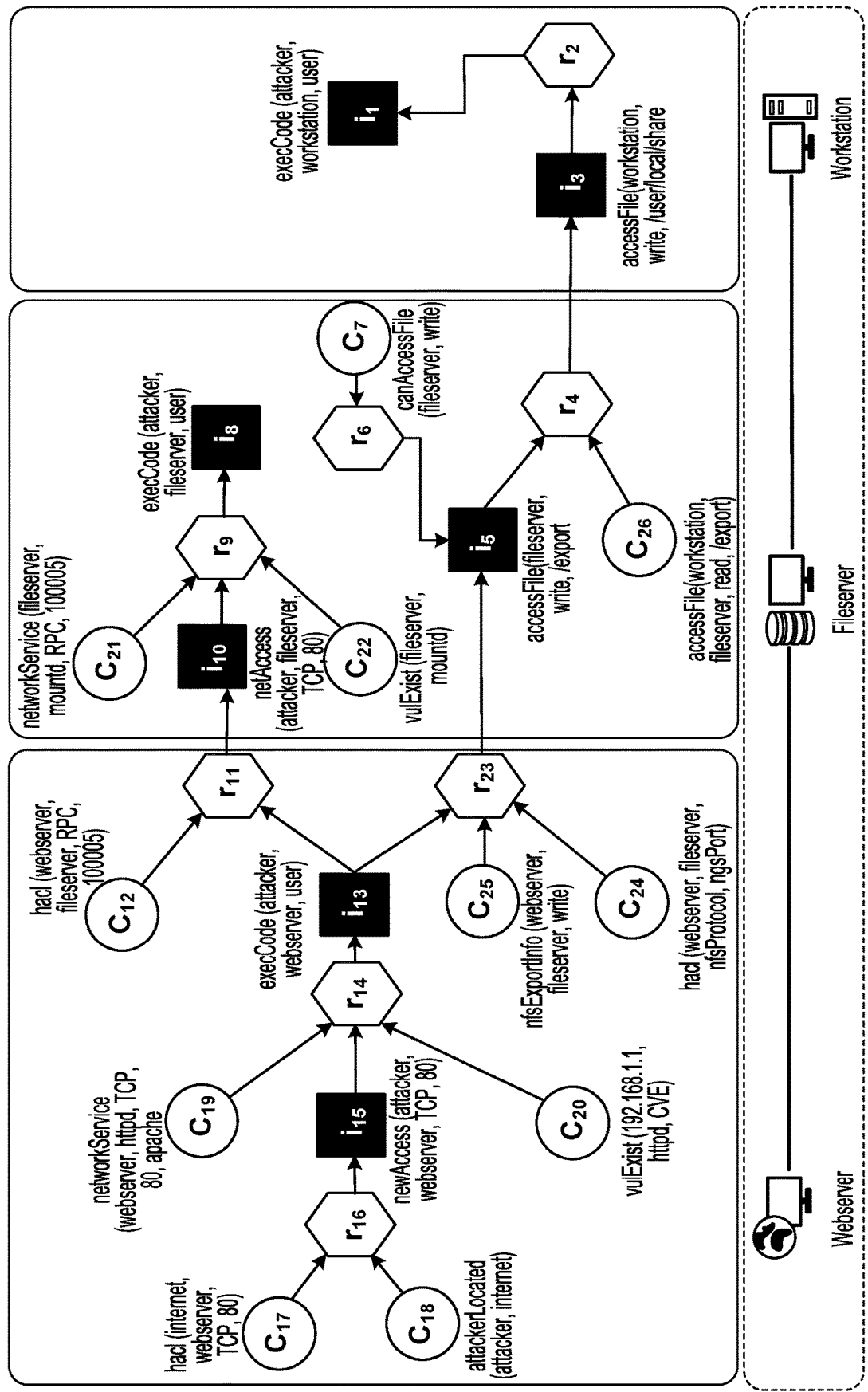
FIG. 9 depicts an example diagram of the analytical attack graph of FIG. 8 mapped to a physical network.
Figure 10:
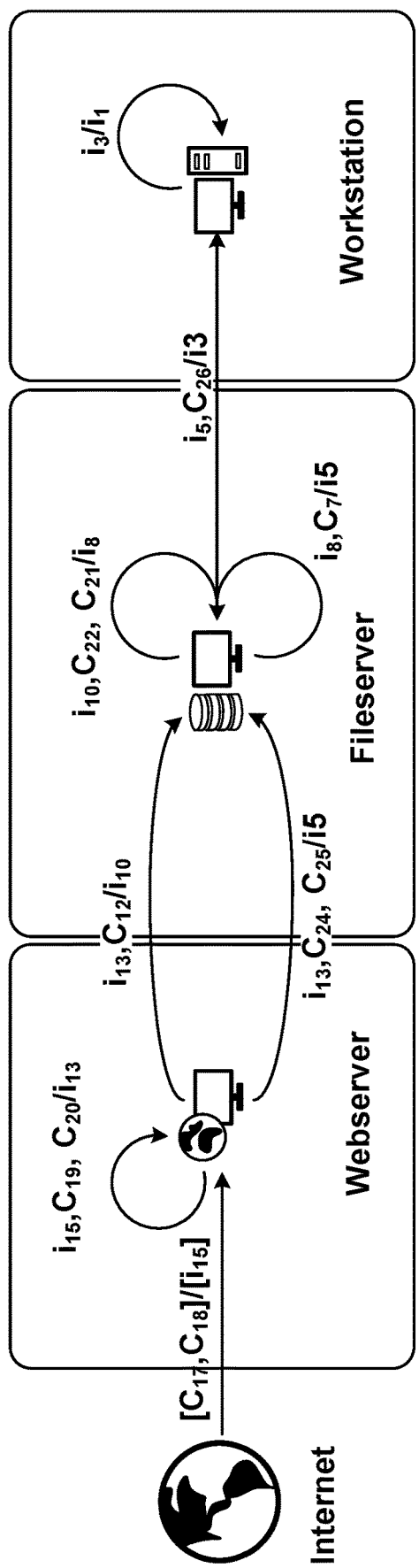
FIG. 10 depicts an example diagram of a physical attack graph equivalent to the analytical attack graphs of FIG. 8 and FIG. 9.

FIG. 9 depicts an example diagram of the analytical attack graph of FIG. 8 mapped to a physical network. FIG. 10 depicts an example diagram of a physical attack graph equivalent to the analytical attack graphs of FIG. 8 and FIG. 9.

Since each action or attack technique may be a set of configurations that cause an impact based on a rule developed by the experts, the hardness of each action may be also identified by experts (e.g., from CVSS scores). If action $a_i$=[C17, C18]/[i15] then $Ha_i$ is the hardness of action i for the attacker. Given an AAG or a PAG, the hardness of every single path may be calculated using $Hp_j = \Sigma Ha_i$ for all actions required to take an attack path to achieve to a target node or target impact. Since AAG and PAG are just two different representations of an attack graph, then $Hp_j$ may be calculated using either of them; in AAG the sum of all $Hs_i$ (the hardness of all attack states or techniques along the path) may be used while in PAG the sum of all $Ha_i$ (the hardness of all attack actions along the path) may be used.

In Agile Security, all supporting assets (also called Configuration Item (CI)) for a given business may first be identified and then all attack paths to those CIs identified. All the attack paths to all CIs may then be shown in one comprehensive graph or separate per CIs, where for both of these cases AAG or PAG may be shown.

In some implementations, a system may also provide asset centric queries to determine a definition of centrality for calculating criticality. For example, the following table shows queries:

distance) then it means reachability to as many nodes as possible throughout the entire network.

Where PAG 2 corresponds to "Webserver," when compromised, provides two attack techniques/tactics for the attacker while "FileServer" provides only one (note: assume i10 and i5 are two different techniques/tactics, if they fall under one tactic then "WebServer" also provides only one tactic for the attacker)—in PAG, links are of different types (techniques/tactics)

Where PAG 3 corresponds to that there is two ways to get to "FileServer" from its neighbor(s) (lunching i10 from "WebServer" or doing i5 from it) but only one way to get to "Workstation" from its neighbor(s) (launching i3 from "FileServer")—Note that this is not about number of neighbors but about number of unique attack techniques/tactics to get to the node Where PAG 4 corresponds to that there are two paths from internet to "WorkStation" and both have to go through "WebServer" and "FileServer."

Where AAG 1 shows in order to get to "WorkStation" from internet, i15, i13, i5, and i3 has to happen. Hence, they have to be launched in any path to this destination however i8 and i10 are not necessarily happening if attacker takes i13 to i5.

In some implementations, the system may calculate a Total Risk (TR) as a metric to show how much risk a system is currently facing—how hard is to compromise assets in the network. In order to calculate the TR of a business process, the system may first determine what assets are supporting the system and, what are the possible impacts on each of them, and how much risk each impact would cause on the entire system. For example, in the 3-node network above, assume that only Workstation is supporting the system and accessFile causes X % risk while codeExecution causes Y % risk on the Workstation. X+Y can be less than, equal, or greater than 100% but when both X and Y happen the risk is 100%. For simplicity, assume that the summation of all impacts is equal to 100%.

TABLE VI

Queries for criticality

| Security Perspective | Analytical Perspective | Example |
| --- | --- | --- |
| What asset, if compromised, provides more lateral movement options for attackers to proceed? | Find the asset with highest outgoing degree centrality (ignore self-links) | PAG 1 |
| What asset (if being compromised) provides more attack TTP options for the attacker to proceed? | Find the asset with highest unique value of outgoing degree centrality | PAG 2 |
| What asset can be compromised with more types of attack techniques/tactics? Reachable with a variety of TTPs and consequently a variety of attacker groups (actors) | Find the asset with highest unique value of incoming degree centrality | PAG 3 |
| What asset most likely has to be compromised when attacker is targeting asset X? the most probable pivot point for reaching to asset X. | Find the betweenness centrality of all paths from any source to asset X in PAG | PAG 4 |
| What action/attack most likely has to be taken when attacker is targeting asset X? the most probable pivot point for reaching to asset X. | Find the betweenness centrality of all paths from any source to asset X in AAG | AAG 1 |
| What asset (if being compromised) provides the opportunity of reaching to more assets throughout the entire network? | Find the asset with highest Eigenvector centrality in PAG | PAG 1 |

Where PAG 1 corresponds an asset (a node in PAG) with highest outgoing degree centrality provides more options for attacker to laterally move within the network (towards another asset)—consider neighbors of neighbors (2-hop Where X+Y equals 100%, the risk imposed by an impact i to the entire system may be calculated as $$Risk = f \times Contribution \qquad \text{Equation (9)}$$

while $f=e^{-H_i/\alpha}$ is the hardness factor of impact i that is calculated based on how hard is to cause that impact and a is a tuning parameter defined as $\alpha=1\ldots 10$ (e.g., $\alpha=7$). The equation implies that the harder an impact (an attack), the lower the risk on the system, and if it is very easy to launch the attack and cause the impact then the entire impact contribution/influence (for example X %) is expected to happen to the system.

For a given AAG (3-node example in FIG. 8) the following may be used calculate Hi and for all the impacts. First, calculate the hardness of all entry point impacts (e.g., those starting with attackerLocated) using the hardness value of their rule that is provided by attack generation engine (rule developers). Then, for any other impact in the graph if the impact is directly caused by a previous impact only (example execCode_13) and not multiple impacts (example accessFile_5) then add the hardness of its rule to the hardness of its previous impact $$H_i = H_{R_i} + H_{i-1} \qquad \text{Equation (10)}$$

If there are multiple rules causing the impact (accessFile_5) then separate the paths to the impact and calculate the hardness of each path using step 2.a (i.e., add the hardness of its rule to the hardness of previous impact) and then use the equation below to integrate the hardness of the impact based on all paths $$\left( \frac{1}{H_i} = \frac{1}{H_{P_1}} + \frac{1}{H_{P_2}} + \ldots \right).$$

$$H_i = f(H_{P_1}, H_{P_2}, \ldots) = \frac{1}{\frac{1}{H_{P_1} + H_{R_{1-i}}} + \frac{1}{H_{P_2} + H_{R_{2-i}}} + \ldots} \qquad \text{Equation (11)}$$

For example, assuming the hardness of all reasoning rules is equal to 1. Then $H_{(netAccess\_15)}=1$, $H_{(execCode\_13)}=2$, $H_{(netAccess\_10)}=3$, $H_{(execCode\_8)}=4$, $H_{(accessFile\_5)}=1/[[1/(H_{(execCode\_13)}+1)]+[1/(H_{(execCode\_8)}+1)]]=1/[[1/(2+1)]+[1/(4+1)]]=1/[1/3+1/5]=1/(8/15)=15/8=1.875$, $H_{(accessFile\_3)}=2.875$, and $H_{(accessFile\_3)}=3.875$.

Hence, the total risk imposed by impacts a and 1 on the Workstation will be $Risk_{impact\ 3}=e^{-2.875/\alpha}\times X$ %, $Risk_{impact\ 1}=e^{-3.875/\alpha}\times X$ %, and Total Risk= $Risk_{impact\ 1}+Risk_{impact\ 1}$ If X+Y is greater than 100%, then if the total contribution (effect in case of attack) is more than 100% then use either Total Risk=100% [$f_{impact\ 1}+f_{impact\ 2}+\ldots$] or Total Risk=$Risk_{impact\ 1}+Risk_{impact\ 1}$ and calculate all $Risk_{impact\ i}$ separately as before. The results may not be same but since there is no specific range for the TR, the upper bound may not make any difference and hence X+Y>100% may just change the upper bound of TR.

Figure 11:
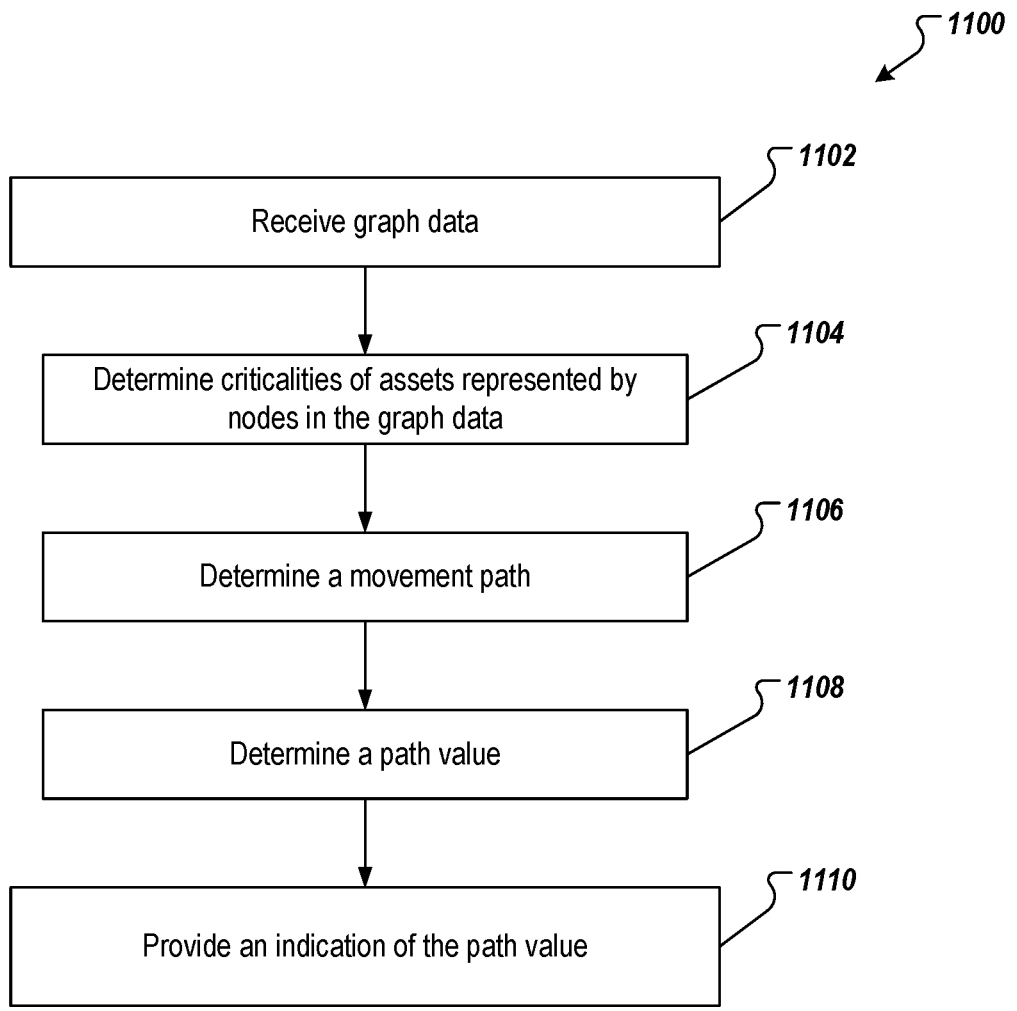
FIG. 11 depicts an example process that can be executed in accordance with implementations of the present disclosure.

FIG. 11 depicts an example process 1100 that can be executed in accordance with implementations of the present disclosure.

The process 1100 includes receiving graph data (1102). For example, the risk analyzer and path finder 410 may receive an attack graph generated by the attack graph generator 404 based on scanned network data scanned by the network data scanner 402.

The graph data may define a graph that is representative of an enterprise network, and include nodes and edges between nodes, where a set of nodes represents respective assets within the enterprise network and each edge represents at least a portion of one or more lateral movement paths between assets in the enterprise network. For example, the attack graph may be the AG shown in FIG. 5B.

The process 1100 includes determining criticalities of assets represented by nodes in the graph data (1104). For example, the risk analyzer and path finder 410 may determine the criticality of each asset in the AG shown in FIG. 5B. In some implementations, determining, for each asset, a criticality of the respective asset to operation of the process includes determining a locality of the asset, determining a centrality of the asset, determining a damage of the asset, and determining the criticality based on the locality of the asset, the centrality of the asset, and the damage of the asset.

For example, the risk analyzer and path finder 410 may determine the locality of SCADA 2 as "3" based on that SCADA 2 is located in Level 2/3, determine the centrality of SCADA 2 as 1.157 based on the amount of bytes exchanged between SCADA 2 and other assets, determine the damage of SCADA 2 as 0.4 based on that SCADA 2 controls 40% of the operational load in the EDS, and determines the criticality of SCADA 2 as 1.239 based on putting those values into Equation 1.

In some implementations, determining a locality of the asset includes determining a position of the node that corresponds to the asset in the enterprise network and determining the locality of the asset based on the position of the node that corresponds to the asset in the enterprise network. For example, the risk analyzer and path finder 410 may determine that SCADA 2 is located in Level 2/3 and, in response, determine a locality of "3" for SCADA 2. In another example, the risk analyzer and path finder 410 may determine that RTU 4 is located in Level 1 and, in response, determine a locality of "4" for RTU 4.

In some implementations, determining a centrality of the asset includes determining a number of edges that are outgoing from the node that corresponds to the asset and determining the centrality of the asset based on the number of edges that are outgoing from the node that corresponds to the asset. For example, the risk analyzer and path finder 410 may determine that SCADA 2 only has one outgoing edge and, in response, determine the centrality of SCADA 2 to be "1." In another example, the risk analyzer and path finder 410 may determine that the Webserver of FIG. 10 has three outgoing edges and, in response, determine a centrality of "3" for the Webserver.

In some implementations, determining a centrality of the asset includes determining a number of unique edges that are outgoing from the node that corresponds to the asset and determining the centrality of the asset based on the number of unique edges that are outgoing from the node that corresponds to the asset. For example, the risk analyzer and path finder 410 may determine that the Webserver of FIG. 10 has three outgoing edges but two use the same issue, i13, and, in response, determine a centrality of "2" for the Webserver.

In some implementations, determining a centrality of the asset includes providing a prompt for a user to indicate a type of asset and determining the centrality of the asset based on the type of asset indicated by the user through the prompt. For example, the system may prompt the user to select the query that best corresponds to a type of node the user considers of high criticality, present the queries shown in Table VI, receive a selection of query from the user, and then define centrality based on the query that was selected.

In some implementations, determining a damage of the asset includes determining a load served by an intended substation, determining a total load serving by an energy delivery system, and determining the damage based on the load served by an intended substation and the total load serving by the energy delivery system. For example, the risk analyzer and path finder 410 may determine that SCADA 2 controls the operational load for 40% in the EDS and, in response, determine the damage of SCADA 2 to be 0.4.

The process 1100 includes determining a movement path (1106). For example, the risk analyzer and path finder 410 may determine two paths to SCADA 1 and two paths to SCADA 2 as shown in Table V.

The process 1100 includes determining a path value (1108). For example, the risk analyzer and path finder 410 may determine a criticality for each of the four different paths as shown in Table V. In some implementations, determining a path value representative of a criticality in preventing an attack through the lateral movement path includes determining the path value based on the criticality of each of the assets represented by nodes along the lateral movement path. For example, the risk analyzer and path finder 410 may determine the criticality of 1.426 for the path 0→1→2→3→4→5→6→7→8→9→10b→11b→12b based on a criticality of every asset along the path.

The process 1100 includes providing an indication of the path value (1110). For example, the system may display the paths to a user in a list, where each path is labeled with the criticality of the path and the paths are sorted to show the paths in descending order of criticality.

In some implementations, the process 1100 includes remediating the attack through the lateral movement path. For example, a vulnerability in the asset with the highest criticality along the path with the greatest criticality may be remediated based on the indication.

In some implementations, the process 1100 includes determining a total risk for the enterprise network based on the graph and providing an indication of the total risk to a user. For example, the system may determine a total risk for the enterprise network based on Equations 9-11 and display the total risk to a user. In some implementations, each time a remediation is done the total risk may be recalculated and the user may determine whether the total risk is acceptable.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method comprising:
providing, by a security platform, graph data defining a graph that is representative of an enterprise network, the graph comprising nodes and edges between nodes, a set of nodes representing respective assets within the enterprise network, each edge representing at least a portion of one or more lateral movement paths between assets in the enterprise network;
determining, for each asset, a criticality of the respective asset to operation of a process based on:
determining a position of a node that corresponds to the respective asset in the enterprise network;
determining a locality of the respective asset based on the position of the node that corresponds to the respective asset in the enterprise network;
determining a centrality of the respective asset;
determining a damage of the respective asset; and
determining the criticality based on the locality of the respective asset, the centrality of the respective asset, and the damage of the respective asset;
determining a lateral movement path between a first node represented by a first asset and a second node represented by second asset within the graph;
determining a path value representative of a criticality in preventing an attack through the lateral movement path; and
providing an indication of the path value representative of the criticality in preventing an attack through the lateral movement path.

2. The method of claim 1, wherein determining a centrality of the asset comprises:
determining a number of edges that are outgoing from the node that corresponds to the asset; and
determining the centrality of the asset based on the number of edges that are outgoing from the node that corresponds to the asset.

3. The method of claim 1, wherein determining a centrality of the asset comprises:
determining a number of unique edges that are outgoing from the node that corresponds to the asset; and
determining the centrality of the asset based on the number of unique edges that are outgoing from the node that corresponds to the asset.

4. The method of claim 1, wherein determining a centrality of the asset comprises:
providing a prompt for a user to indicate a type of asset; and
determining the centrality of the asset based on the type of asset indicated by the user through the prompt.

5. The method of claim 1, wherein determining a damage of the asset comprises:
determining a load served by an intended substation;
determining a total load serving by an energy delivery system; and
determining the damage based on the load served by an intended substation and the total load serving by the energy delivery system.

6. The method of claim 1, wherein determining a path value representative of a criticality in preventing an attack through the lateral movement path comprises:
determining the path value based on the criticality of each of the assets represented by nodes along the lateral movement path.

7. The method of claim 1, comprising:
remediating the attack through the lateral movement path.

8. The method of claim 1, comprising:
determining a total risk for the enterprise network based on the graph; and
providing an indication of the total risk to a user.

9. A system comprising:
one or more computers and one or more storage devices storing instructions that are operable, when executed by the one or more computers, to cause the one or more computers to perform operations comprising:
providing, by a security platform, graph data defining a graph that is representative of an enterprise network, the graph comprising nodes and edges between nodes, a set of nodes representing respective assets within the enterprise network, each edge representing at least a portion of one or more lateral movement paths between assets in the enterprise network;

determining, for each asset, a criticality of the respective asset to operation of a process based on:
 determining a position of a node that corresponds to the respective asset in the enterprise network;
 determining a locality of the respective asset based on the position of the node that corresponds to the respective asset in the enterprise network;
 determining a centrality of the respective asset;
 determining a damage of the respective asset; and
 determining the criticality based on the locality of the respective asset, the centrality of the respective asset, and the damage of the respective asset;

determining a lateral movement path between a first node represented by a first asset and a second node represented by second asset within the graph;

determining a path value representative of a criticality in preventing an attack through the lateral movement path; and providing an indication of the path value representative of the criticality in preventing an attack through the lateral movement path.

10. The system of claim 9, wherein determining a centrality of the asset comprises:
 determining a number of edges that are outgoing from the node that corresponds to the asset; and
 determining the centrality of the asset based on the number of edges that are outgoing from the node that corresponds to the asset.

11. The system of claim 9, wherein determining a centrality of the asset comprises:
 determining a number of unique edges that are outgoing from the node that corresponds to the asset; and
 determining the centrality of the asset based on the number of unique edges that are outgoing from the node that corresponds to the asset.

12. The system of claim 9, wherein determining a centrality of the asset comprises:
 providing a prompt for a user to indicate a type of asset; and
 determining the centrality of the asset based on the type of asset indicated by the user through the prompt.

13. The system of claim 9, wherein determining a damage of the asset comprises:
 determining a load served by an intended substation;
 determining a total load serving by an energy delivery system; and
 determining the damage based on the load served by an intended substation and the total load serving by the energy delivery system.

14. The system of claim 9, wherein determining a path value representative of a criticality in preventing an attack through the lateral movement path comprises:
 determining the path value based on the criticality of each of the assets represented by nodes along the lateral movement path.

15. The system of claim 9, the operations comprising:
 remediating the attack through the lateral movement path.

16. A non-transitory computer-readable medium storing software comprising instructions executable by one or more computers which, upon such execution, cause the one or more computers to perform operations comprising:
 providing, by a security platform, graph data defining a graph that is representative of an enterprise network, the graph comprising nodes and edges between nodes, a set of nodes representing respective assets within the enterprise network, each edge representing at least a portion of one or more lateral movement paths between assets in the enterprise network;
 determining, for each asset, a criticality of the respective asset to operation of a process based on:
  determining a position of a node that corresponds to the respective asset in the enterprise network;
  determining a locality of the respective asset based on the position of the node that corresponds to the respective asset in the enterprise network;
  determining a centrality of the respective asset;
  determining a damage of the respective asset; and
  determining the criticality based on the locality of the respective asset, the centrality of the respective asset, and the damage of the respective asset;
 determining a lateral movement path between a first node represented by a first asset and a second node represented by second asset within the graph;
 determining a path value representative of a criticality in preventing an attack through the lateral movement path; and
 providing an indication of the path value representative of the criticality in preventing an attack through the lateral movement path.

\* \* \* \* \*